Figure 1:
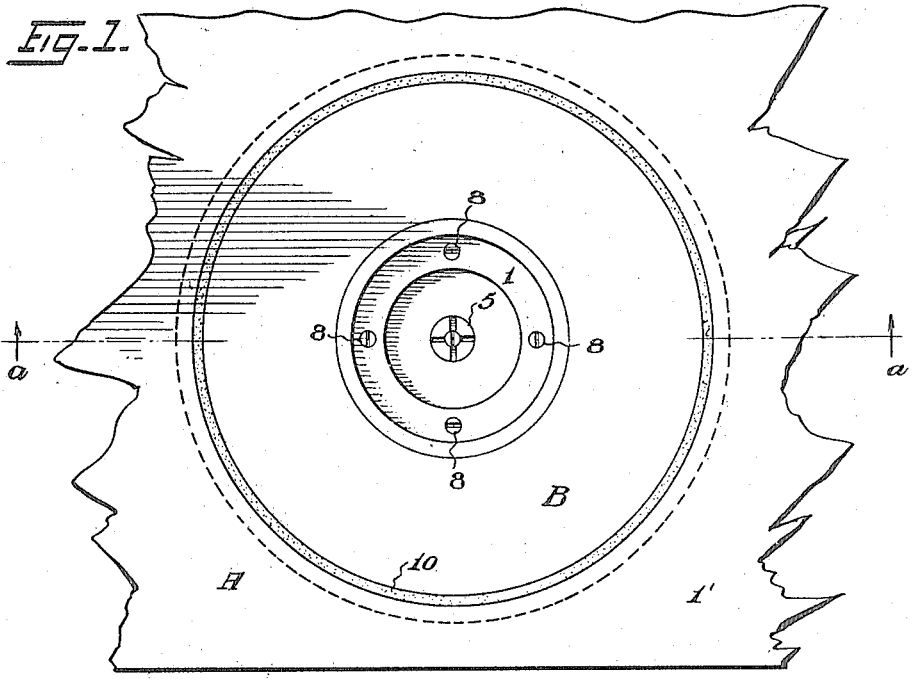

E. M. WINTER.
DEVICE FOR GAGING MANUFACTURED PARTS.
APPLICATION FILED APR. 19, 1916.

1,208,258.

Patented Dec. 12, 1916.
3 SHEETS—SHEET 1.

Witnesses:

Inventor:
Edwin M. Winter;
his Atty.

E. M. WINTER.
DEVICE FOR GAGING MANUFACTURED PARTS.
APPLICATION FILED APR. 19, 1916.
1,208,258.
Patented Dec. 12, 1916.
3 SHEETS—SHEET 2.
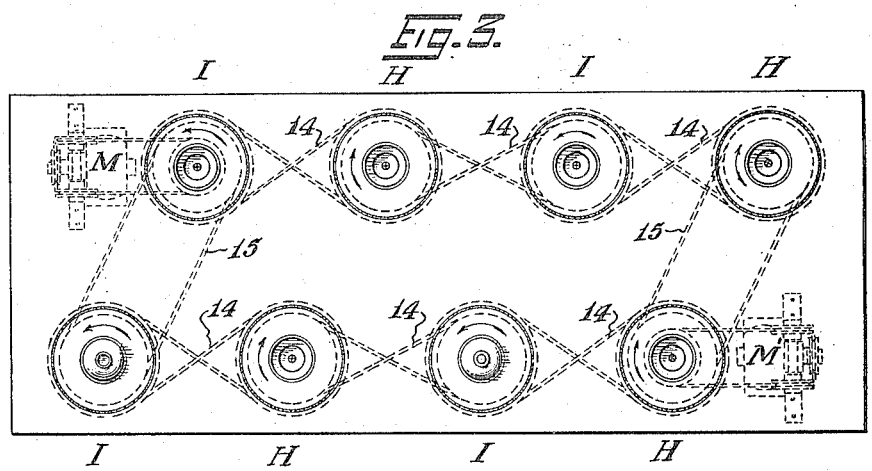
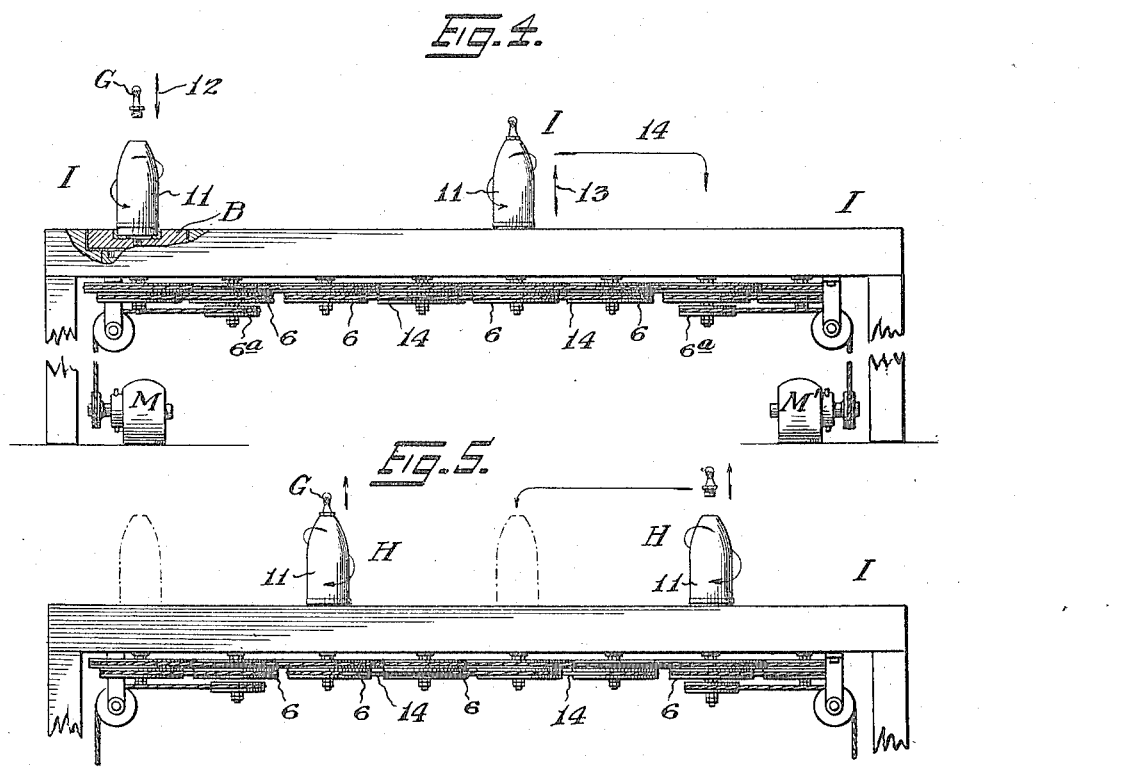

E. M. WINTER.
DEVICE FOR GAGING MANUFACTURED PARTS.
APPLICATION FILED APR. 19, 1916.

1,208,258.

Patented Dec. 12, 1916.
3 SHEETS—SHEET 3.

UNITED STATES PATENT OFFICE.

EDWIN M. WINTER, OF EAST ORANGE, NEW JERSEY, ASSIGNOR OF ONE-HALF TO A. N. VAN DEMAN, OF NEW YORK, N. Y.

DEVICE FOR GAGING MANUFACTURED PARTS.

1,208,258.  Specification of Letters Patent.  Patented Dec. 12, 1916.

Application filed April 19, 1916.  Serial No. 92,245.

*To all whom it may concern:*

Be it known that I, EDWIN M. WINTER, a citizen of the United States, residing in East Orange, in the county of Essex and State of New Jersey, have invented certain new and useful Improvements in Devices for Gaging Manufactured Parts, of which the following is a specification.

In the arts, especially in the manufacture of shells, etc., it is frequently absolutely essential that threaded screw holes or studs should be accurately tested and gaged to micrometric fineness by the use of proper hardened steel gages. This is, in the manufacture of projectiles, such as shrapnel, and other shells of conical form, practically and absolutely essential. And the testing and gaging of the screw threaded connections of necessity must be made by mechanicians and inspectors of highest type and knowledge, and consequently those who of necessity receive a comparatively large wage.

In such inspection and testing, especially in the case of projectiles, the gages are inserted by hand, and screwed into position to see that the fit is accurate, and then are unscrewed. The inspection is complete, and the test made when the gage is screwed fully home. Consequently if the high priced inspector's time is taken up by the removal of the gage, which has been set under his supervision, or by him, much of his valuable and costly time is wasted and the cost of inspection practically doubled.

The object of my invention is to provide an apparatus, mechanism or testing-table in which the cost of such gaging and inspection may be reduced to a minimum; and in which the labor of the removal of the shells, especially the defective ones, and the removal of the gages used, may be done by unskilled and cheap labor.

As shown and described herein my invention, while not limited to such use, is shown as applied to the testing and gaging of the screw threaded point orifices of artillery projectiles, to ascertain that the same are accurately machined to receive the time or percussion fuses; and in such shells it is practically essential that the errors of the machining of the thread should lie practically within the limits of .002" to .004", and should not vary greatly therefrom.

To such ends my invention consists in substance, in providing a suitable support or table, upon which the shells, or other articles to be tested, are placed, either from a mechanical feeding mechanism, or by hand, and are swiftly rotated. The rotation during the insertion by the high class inspector of the gage, being in the screwing in direction; it only being necessary for him to hold the gage in his hand, insert it into the shell, or other article, and the rotation thereof immediately screws it into position, and makes the test. The shell, or article, is then shifted to a device which rotates it in opposite direction, and here an operator of a cheaper grade of labor, (herein called a helper) removes the gage by merely grasping hold of the same while the rotation of the shell, or article, in the reverse direction unscrews it and permits of its removal.

In the simplest form of embodiment of my invention as shown applied to conical shrapnel shells, my invention consists of a table having mounted thereon a plurality of revolving-disk supports, having cavities adapted to receive the bases of the shell so as to maintain the same in an upright position; each adjacent pair of such supporting disks or shell-supports rotating reversely to one another.

In some cases and especially in the case of shells of large caliber, and heavy weight, instead of placing the shell upright upon its base for this purpose of inspection, a slightly modified form of inspecting table is used wherein the shell is supported in a horizontal position; but the principle of the rotation of the article or shell, first in one direction and then in the other, and of the testing and inspection, is substantially the same in both cases.

My said invention is shown and fully described in the following specification of which the accompanying drawings form a part, wherein similar letters and numerals of reference designate like or similar parts wherever found throughout the several views, and in which:—

Figure 2:
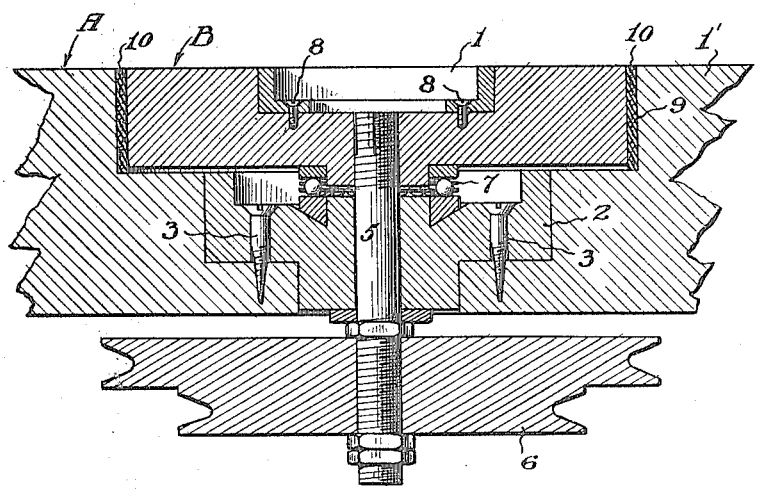
Figure 6:
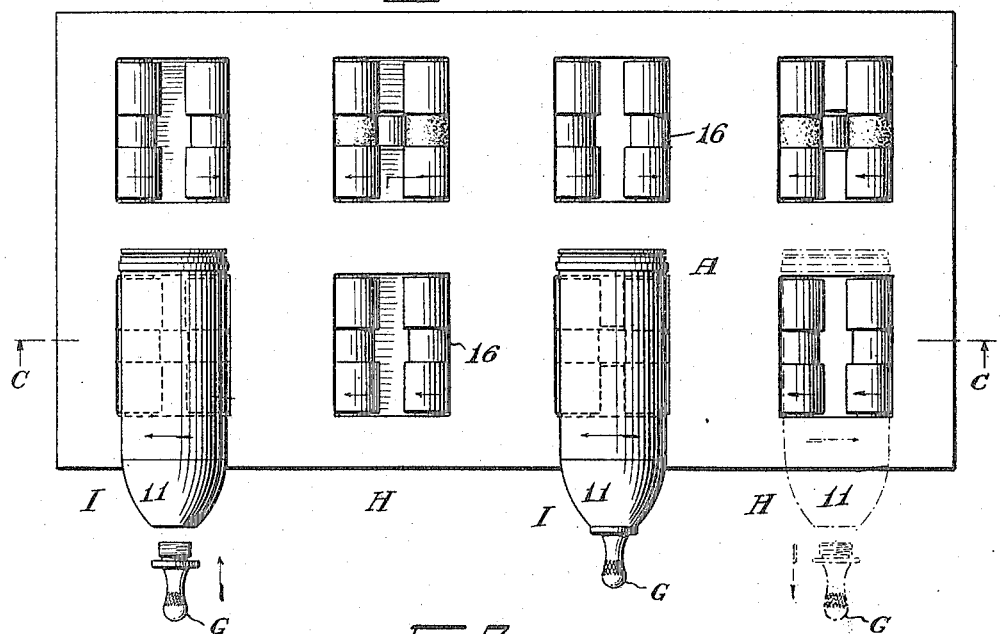
Figure 7:
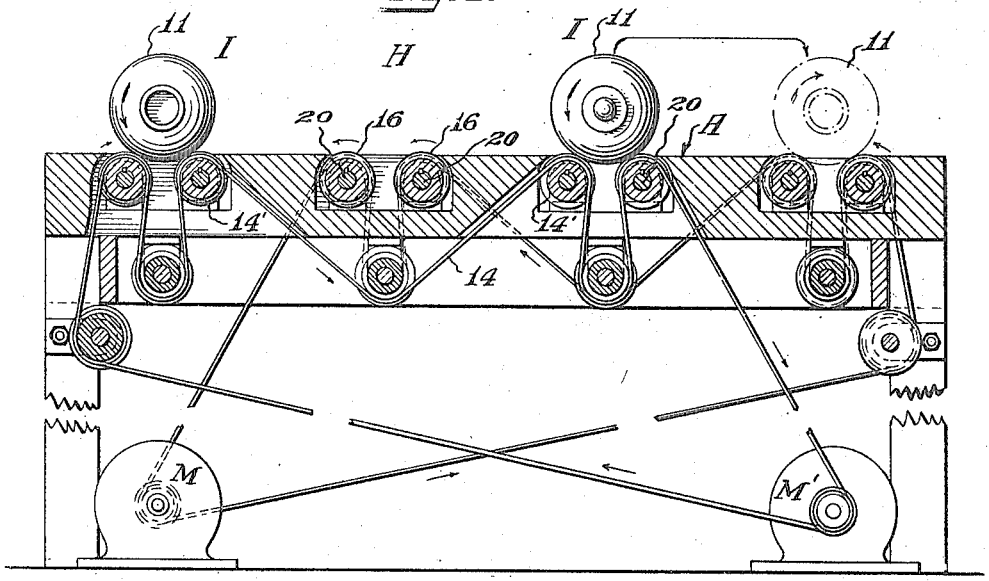

Figure 1 is a top plan view of one of the rotating shell supports in position on its table. Fig. 2 is a side view looking from the bottom of Fig. 1 in the direction of the arrow, taken in central vertical section on the line *a—a* of Fig. 1. Fig. 3 is a top plan view of a complete shell testing and inspecting table of such form having the shell supports shown in Figs. 1 and 2, showing in dotted lines the belt-gearing for the rotation of such shell supports; such table having eight of such supports, being adapted therefore, for use at the same time for such purpose of testing, by four inspectors each having a minor assistant or helper at the adjacent gage removing reversely revolving support. Fig. 4 is a front view of the table shown in Fig. 3, showing two shells in the inspecting and testing position; and Fig. 5 is a view similar to Fig. 4 showing the position assumed by the shells when in position for the removal of the testing plugs or gages, by the helper. Fig. 6 is a top plan view of a modified form of shell testing table, especially designed for use in gaging and testing projectiles of large caliber and heavy weight, which differs from the type of testing table shown in Figs. 1 to 5, in that the shells are placed thereon in horizontal instead of a vertical and perpendicular position; and Fig. 7 is a front face view of the modified construction shown in Fig. 6, taken in vertical section on the line $c-c$ of same, looking upward from the bottom of such Fig. 6.

Inasmuch as in the inspection of shells rapidity of action is one of the greatest of desiderata, and as the main cost thereof is in the high price of the salaries of the inspectors necessary; in order that the accidental stoppage of the table may be reduced to a minimum, I provide as part of my embodiment of such invention, two motors and a double-belt-gearing, for the rotation of the shell supporting-disks or rolls in the main table; by the use of which there will be no stoppage of the machine, unless both motors or both series or systems of connecting belting are put out of commission at the same time.

In the simplest form of embodiment of my invention in Figs. 1 to 5 inclusive the same comprises a main table A in which are revolubly mounted the rotatable shell supporting disks B having the central shell-receiving cavity 4, which disks are each mounted upon a spindle shaft 5, and are provided with an anti-friction ball bearing 7 resting on the support 2 held in place in the table A by screws 3, (Figs. 1 and 2); and secured upon the lower ends of the shafts 5, underneath the main table A, is in each case a double grooved-belt-pulley 6, around which are passed the cross-belting 14, as clearly indicated in Figs. 3, 4 and 5, connecting such eight-shell-supports together, so that each support will be rotated reversely to those adjacent to it; the reference letters I, designate those shell supports before which the inspectors stand or sit and insert the gages and perform the inspection; while the letters H, designate those before which stand or sit their helpers who remove the gages and pass the projectile into the accepted or rejected piles. The shell-supporting disks B are each provided with a central-sleeve-socket 1 of such shape, size and contour as to receive the bases of the projectiles 11 to be gaged and tested, and the same are held in place by screws 8, so that sockets of different sizes may be used.

To the stud-shaft 5 of the shell-supports, are secured additional drive-wheels $6^a$ in operative connection by suitable belting usually of circular form in cross section as shown; which are respectively connected up to two motors M and M', (Figs. 4 and 7) usually located as shown. While I have shown round belting, it is evident that flat or triangular belting or any other desired form of gearing, to bring about rotation of the shell supports in the manner desired, may be used with like effect.

Usually but not necessarily in order to protect the bearing of the shaft 5, and especially the anti-friction ball-bearing 7, from the entrance of dust, etc., rings or gaskets 10 of any suitable anti-friction material such as soft felt, usually kept saturated with oil, black-lead or other anti-friction composition, are interposed between the same and the wall of the cavity in which the supporting-disks are located in the table A, as clearly indicated in Figs. 1 and 2.

It will be seen that by reason of the use of two motors and a double system of belting, that even though one system of belts, or one of the motors should break, stop or become disarranged, that the device would still be operative.

In operation the shells are placed in position in front of the inspector, as indicated at I in Figs. 3 and 4, and the rotation thereof is to the left or against the hands of a watch. The inspector takes in his hand the gage G (Fig. 4) inserts it in the screw threaded fuse hole of the shell, and holds it fast; whereupon the rotation of the shell screws the same home. The shell is then shifted to his helper, or to his right, at the bottom of Fig. 3, or to the left at the top of Fig. 3; whereupon such helper grasping the handle of the gage G, the rotation of the shell in the opposite direction will cause the unscrewing, and release of the gage; which is then returned to the inspector. The inspector designates to the helper the result of the inspection, by saying "passed" or "rejected" whereupon the helper deposits the projectile in the passed or rejected piles.

The modified form of table used for heavier projectiles, say from six inch upward, instead of having the rotating disks or supports B, is provided with a plurality of rollers 16, in pairs spaced slightly apart, as shown in Figs. 6 and 7, which are mounted upon the horizontal shafts 20, mounted on which are the doubly grooved belt-wheels 14', connected by suitable-belting 14 with the two motors M and M', as in the construction shown in Figs. 1 to 5. As in the former described construction, I, indicates the position of the inspector and H the position of the helper.

I claim:—

1. In a device of the class described, means for supporting the article to be gaged and tested rotating in one direction, during the insertion of the gage; and like means rotating in the reverse direction adjacent thereto for rotating the article to be tested reversely to withdraw the gage.

2. In a device of the class described, a supporting table; a plurality of revoluble supports carried by such table each adapted to receive and rotate therewith a cylindrical body, the adjacent supports rotating reversely to one another.

3. In a device of the class described, a plurality of revoluble supports adapted to receive cylindrical bodies and rotate the same, the adjacent supports rotating reversely to one another; two motors for bringing about rotation of the same; gearing connecting such two motors with such supports in such manner that the stoppage of either motor or disarrangement of any single set of gearing will not stop the rotation of the various supports.

4. In a device of the class described, a plurality of revoluble supports adapted to receive cylindrical bodies and rotate the same, the adjacent supports rotating reversely to one another; two motors for bringing about rotation of the same; belting connecting such two motors with each of such supports, in such manner that the stoppage of either motor, or disarrangement, or breaking of any belt, will not stop the rotation of any of the various rotating supports.

EDWIN M. WINTER.

Witnesses:
H. D. PENNEY,
A. N. VAN DEMAN.

Copies of this patent may be obtained for five cents each, by addressing the "Commissioner of Patents, Washington, D. C."